United States Patent [19]

Kumakura et al.

[11] Patent Number: 4,808,811
[45] Date of Patent: Feb. 28, 1989

[54] LIGHT INTEGRATING CIRCUIT FOR USE IN A LIGHT MEASURING DEVICE WHICH IS ACCURATE FOR BOTH LOW AND HIGH LIGHT VALUES

[75] Inventors: Tosiyuki Kumakura, Kanagawa; Hiroyuki Kataoka, Tokyo; Kouichi Ohmori, Kanagawa, all of Japan

[73] Assignee: Canon Kabushiki Kaisha, Tokyo, Japan

[21] Appl. No.: 107,879

[22] Filed: Oct. 9, 1987

Related U.S. Application Data

[63] Continuation of Ser. No. 753,243, Jul. 9, 1985, abandoned.

[30] Foreign Application Priority Data

Jul. 9, 1984 [JP] Japan ................. 59-141791
Jul. 9, 1984 [JP] Japan ................. 59-141792
Jul. 9, 1984 [JP] Japan ................. 59-141793

[51] Int. Cl.$^4$ ............. G01J 1/00; G03B 7/08
[52] U.S. Cl. ............. 250/214 L; 354/427; 356/223; 250/214 P
[58] Field of Search ........ 250/214 R, 214 L, 214 P, 250/214 C, 206; 307/311; 354/425–428; 356/215, 218, 223, 226

[56] References Cited

U.S. PATENT DOCUMENTS

| | | | |
|---|---|---|---|
| 3,679,905 | 7/1972 | Watanabe | 250/214 L |
| 3,928,860 | 12/1975 | Numata et al. | 354/425 |
| 4,241,279 | 12/1980 | Numata | 356/223 |
| 4,357,084 | 11/1982 | Kimura | 354/427 |

*Primary Examiner*—Edward P. Westin
*Attorney, Agent, or Firm*—Toren, McGeady & Associates

[57] ABSTRACT

A light measuring circuit including a light sensing device for sensing light and producing a signal representative of the light sensed, a compressing circuit for compressing the signal, a capacitor having one terminal connected to a predetermined voltage, a charging circuit responsive to the compressing circuit for charging the capacitor, a detecting circuit for responding to the voltage level of the capacitor, a switch for shorting the capacitor when closed for initiating charge of the capacitor by opening, and a delay circuit coupled to one of the charging circuits and the switch for delaying the onset of charge of the capacitor.

7 Claims, 5 Drawing Sheets

| Q | PHOTO CURRENT | | |
|---|---|---|---|
| | a | b | c |
| 0 | 0mV | -∞ | 0mV |
| 1 | 18mV | 0mV | 41.8mV |
| 2 | 28.6mV | 18mV | 57.1mV |
| 3 | 36.0mV | 28.6mV | 66.7mV |
| 4 | 41.8mV | 36.0mV | 73.7mV |
| 5 | 46.6mV | 41.8mV | 79.2mV |
| ⋮ | ⋮ | ⋮ | ⋮ |
| 8 | 57.1mV | 54.0mV | 90.9mV |
| | ⋮ | ⋮ | ⋮ |

LIGHT INTEGRATING CIRCUIT FOR USE IN A LIGHT MEASURING DEVICE WHICH IS ACCURATE FOR BOTH LOW AND HIGH LIGHT VALUES

This is a continuation of application Ser. No. 753,243, filed July 9, 1985, now abandoned.

BACKGROUND OF THE INVENTION

1. Field of the Invention

This invention relates to light measuring devices, and particularly to light integrating circuits for converting quantities of light into electrical signals. The invention is especially directed to light measuring devices for use in cameras.

2. Description of Related Art

The dynamic range of a conventional light integrating circuit, that is a light measuring device using an integrating circuit, is too small to respond efficiently to changes in the amount of light impinging thereon. For example, if the voltage of such a device varies between 18 mV and 2V, the ratio of the highest voltage to the lowest voltage is $2^7$. This is the equivalent of only 7 steps in a camera aperture, or more generally, only 7 steps in the APEX value system.

When a camera uses through the lens (TTL) light metering to adjust a flash unit, the light integrating circuit of the measuring system requires a dynamic range of 10 APEX steps just to accommodate film sensitivities from ISO 6 to ISO 6400. Ten more APEX steps are necessary for changing the value of a photographic lens from F 1.0 to F 32. Thus, changing the film sensitivity and aperture value independently requires a dynamic range of 20 APEX steps.

Consequently, conventional light integrating circuits used with flash devices to control the amount of light shed on the object, have a dynamic range which is too narrow for this purpose.

The dynamic range of a light integrating circuit may be widened by logarithmically compressing the photo current produced in the light measuring photo sensor, such as a photodiode. In this manner, each doubling of the amount of light striking the photodiode results in a linear increase in integrated voltage. Thus, a change in output voltage from 18 mV to 1.8V, presents 100 doublings, or a dynamic range of 100 APEX steps.

However, it has been discovered that light integraters using logarithmic compression are accurate only for large light quantities and becomes less accurate at smaller light quantities.

SUMMARY OF THE INVENTION

It is an object of the invention to improve light integrating circuits.

It is another object of the invention to avoid the aforementioned deficiencies.

It is yet another object of the invention to furnish a light integrating circuit which is accurate when measuring low light values as well as higher amounts.

According to a feature of the invention, these and other objects of the invention are attained in a light integrating circuit which compresses the signal from a photosensor and charges an integrating capacitor beyond a given value, by delaying the time from the start of measurement that the charge exceeds the given value so as to delay the introduction of the logarithmic rise from the given value.

According to an aspect of the invention, the objects are attained in a light integrating circuit in which a signal from a light sensor element is compressed and charges an integrating capacitor connected to an emitter of a transistor, by precharging the integrating capacitor to a predetermined inverse voltage so that the compressed charge must first remove the precharge before rising logarithmically.

According to another feature of the invention, a voltage source produces the precharging current and a switching arrangement separates the voltage source from the capacitor at the start of the light integrating operation.

According to another feature of the invention, in a light integrating circuit which compresses the signal from a photo sensor and changes the charge on one integrating capacitor on the basis of the compressed signal, a detector disables the operation of the integrating capacitor while conducting its own integrating operation and enables the operation of the integrating capacitor only after the detectors integration reaches a predetermined value.

According to another aspect of the invention, in a light integrating circuit which compresses the signal from a photo sensor and changes the charge on an integrating capacitor on the basis of the compressed signal, a plurality of parallel connected expanding transistors respond to the compressed signal and changes the charge on the integrating capacitor.

According to other aspects of the invention, the circuit forms part of a camera, a flash unit, or photographic system.

Other objects and advantages of the invention will become evident from the following detailed description when read in light of the accompanying drawings.

DESCRIPTION OF PREFERRED EMBODIMENTS

Figure 1:
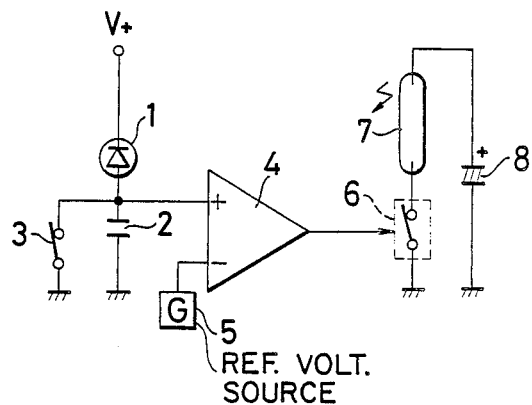
FIG. 1 is a circuit diagram illustrating a conventional flash device utilizing a light integrating circuit.
Figure 2:
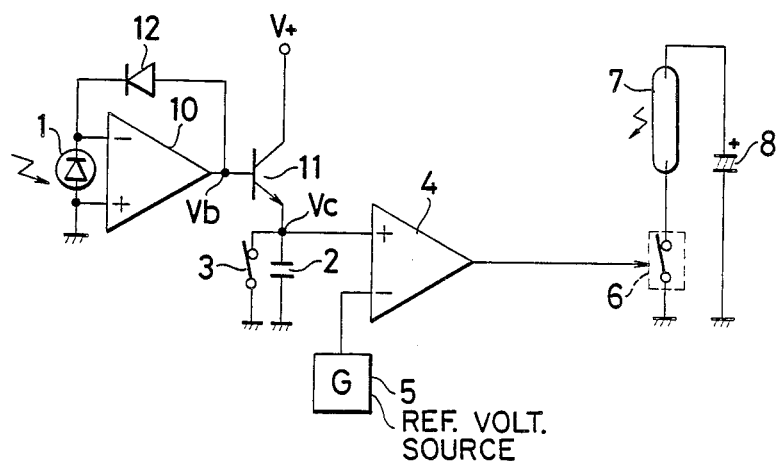
FIG. 2 is a circuit diagram of a conventional flash device utilizing a light integrating circuit with compression.

The invention will best be understood by comparison with the two conventional flash systems shown in FIGS. 1 and 2. In the flash system of FIG. 1, a conventional light integrating circuit detects the amount of light reflected by an object. The light reflected from the object strikes a photodiode 1 to produce a photoelectric current which is stored by a capacitor 2 when a switch 3 is opened upon initiation of the flash. A comparator 4 compares the terminal voltage of the capacitor 2 with the voltage of a reference voltage source 5 to detect the amount of light striking the photodiode 1. When the value of the charge across the capacitor 2 reaches the voltage of source 5, the comparator 4 operates a switch 6 in series with the flash tube 7 of the flash unit so as to control the current from a storage capacitor 8.

As previously stated, if the voltage produced by the reference source 5 extends from 18 mV to 2V, ratio of the highest voltage to the lowest voltage is $2V/18 mV = 2^7$. This allows only seven steps of APEX value representation. As previously mentioned, at least 20 APEX steps are necessary.

FIG. 2 shows another flash arrangement with another conventional light integrating circuit. Here, the dynamic range is widened by logarithmically compressing the photo current produced in the photodiode 1. An operational amplifier 10 senses the photocurrent through the photodiode 1. A transistor 11 responds to the operational amplifier 10 by charging the capacitor 2, which is now in the emitter circuit of the transistor 11, when the switch 3 is open. In FIG. 2, a logarithmically compressing diode 12 in the feedback loop of the operational amplifier 10 widens the dynamic range of the photocurrent by logarithmically compressing it. However, this circuit operates accurately only in response to high amounts of light and not to smaller amounts.

The deficiencies of circuits such as those in FIG. 2 will be recognized from the following:

If the photo current flowing through the photodiode 1 is ip, the base voltage Vb of the transistor 11 is represented by $$Vb = (KT/q) \ln (ip/is) \quad (1)$$

where
- is = Inverse saturation current diode
- K = Boltzmann coefficient
- T = Absolute temperature
- q = Charge of an electron If the emitter current of the transistor 11 is i(t), the terminal voltage Vc of the capacitor 2 is represented as follows:

$$Vc = \frac{1}{C} \int_0^t i(t) dt \quad (2)$$

The value i(t) is determined by the voltage Vb-Vc between the base and the emitter of the transistor 11 and represented as follows:

$$i(t) = is \exp [(q/KT)(VB-Vc)] \quad (3)$$

In conclusion, the terminal voltage Vc of the capacitor 2 is represented as follows:

$$Vc = \alpha \ln (Q + 1) \quad (4)$$

where: $\alpha = \frac{KT}{q}$

-continued
$$Q = C \int_0^t ip \, dt \quad (C = \text{Constant}).$$

From known constants, $\alpha$ is about 26 mV for ordinary temperature. When Q is much larger than 1, the value of Vc increases 18 mV (=0.026 ln 2) each times Q doubles. That is, when the amount of light incident on the photodiode doubles, the terminal voltage Vc of the capacitor 2 increases 18 mV.

Hence, changing the output voltage of the reference voltage generator 5 from 18 mV to 1800 mV, produces the dynamic range of 100 APEX steps.

Equation (4) representing the terminal voltage of the capacitor of the light integrating circuit shown in FIG. 2 includes a (Q+1) term. Thus, as shown by curve "a" in FIG. 3, when Q is substantially greater than 1, a logarithmic relation prevails between the amount of light incident on the photodiode and the terminal voltage of the capacitor. However when Q is not sufficiently greater than 1, the logarithmic relation between the amount of light incident on the photodiode and the terminal voltage of the capacitor no longer holds.

Figures 3, 4:
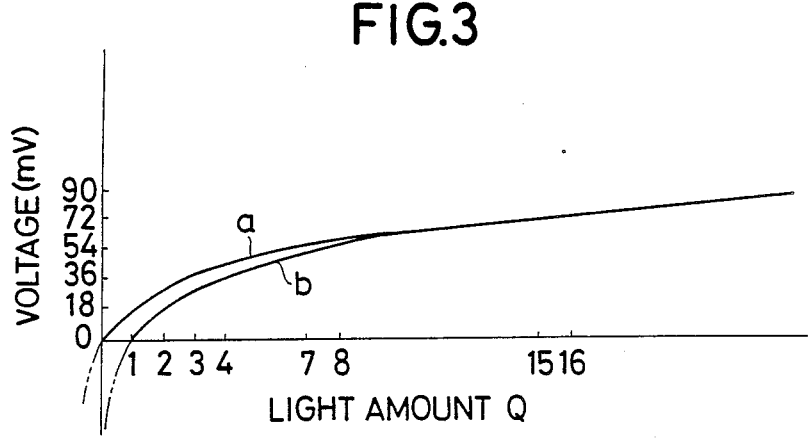
FIG. 3 is a graph contrasting the operation of the prior art devices of FIGS. 1 and 2 with devices embodying the invention.
FIG. 4 is a table contrasting the operation of the prior art devices of FIGS. 1 and 2 with devices embodying the invention.

For example, as shown by curve a in FIG. 3 and column a of the table in FIG. 4, when Q is sufficiently large and doubles, the terminal voltage of the capacitor increases 18 mV, while when Q is near 1 and doubles, for example, as Q changes from 2 to 4, the terminal voltage of the capacitor increases only 13.2 mV. On the other hand, generally as the light adjusting level of the flash unit increases one APEX step, the standard level representing the light adjusting level increases to a predetermined value. Consequently, where the light emission of the flash light device is stopped, if the light adjusting level is low when the light integrating circuit is used as the light adjusting circuit of the flash unit, that is, if the level of the light reflected by the object from the flash light device only reaches a very low level, a logarithmic relation between the amount of light incident on the photodiode and the terminal voltage of the capacitor does not obtain. Hence, a large error exists in the light adjusting level, and a proper flash exposure cannot be obtained.

Figure 5:
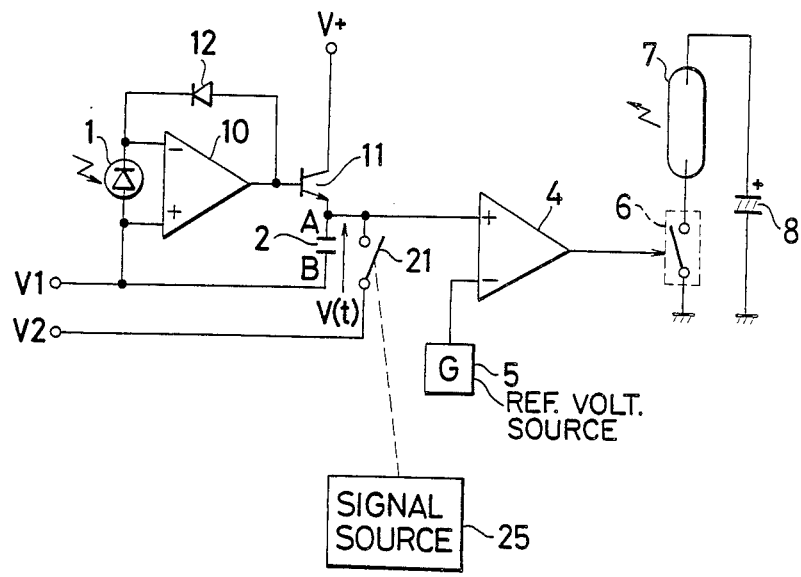
FIG. 5 is a schematic diagram of a device embodying features of the invention.

In the disclosed systems embodying the present invention and containing light integrating circuits, elements having the same reference numerals as those of FIGS. 1 and 2 denote like parts, and their explanations are omitted. In FIG. 5, which illustrates an embodiment of the invention, a switch 21 is normally closed before a light measurement and opens in synchronism with the start of a light measurement. A voltage V1 connected to the non-inverting terminal of the operational amplifier 10 applies its voltage to the terminal B of the capacitor 2 while a voltage V2, which is less than the voltage V1, applies its potential to the terminal A of the capacitor 2 through the closed switch 21. Hence, while the switch 21 is closed, the capacitor 2 is charged to an inverse voltage −(V2-V1). After opening of the switch 21, the capacitor 2 is charged by the emitter current of the expander transistor 11.

The switch 21 is constructed to be closed upon closing of the flash unit's power switch (not shown) and to be opened either by a signal source 25 which produces the signal that actuates the light emission of the flash unit, or the signal synchronous with the time the camera shutter starts to run. In any case, the switch is constructed to close before the start of the light measurement by the light integrating circuit, and opened upon start of the light measurement by the light integrating circuit.

In operation, when the switch 21 is closed before the start of the operation of the light integrating circuit, the terminals A and B of capacitor 2 are set at voltages V2 and V1, respectively, so as to charge the capacitor to a voltage difference of V1-V2 or −(V2-V1).

When the switch 21 is opened, the expander transistor 11 begins to charge the capacitor 2 with current that is established by the operational amplifier 10 and the diode 12 compressing the photocurrent produced by light striking the photodiode 1.

Because the voltage at the terminal A of the capacitor 2 is pre-set at the potential V2 for the start of the light measurement, and the capacitor 2 has been charged with the voltage difference −(V2-V1) across its terminals, opening of the switch 21 at the start of light measurement causes the voltage at the terminal A first to rise to the level V1.

Hence, the voltage at the terminal A starts at a value less than the reference value V1, and follows a curve such as the curve b in FIG. 3. A more detailed representation of the curves a and b appears in FIG. 6. Here, the curve b virtually follows an ideal logarithmic curve c even in the range in which the amount of light Q is quite low. Consequently, applying light adjustment on the basis of APEX values to the present invention, namely increasing the voltage of the reference voltage source by a predetermined value every time the light adjustment level is doubled, reduces the error to a very small value.

In this embodiment, the value V2 is set 54 mV lower than the reference bias level V1. The voltage V2 may be further lowered where it is necessary to make the relationship between the terminal voltage of the capacitor 2 and the incident light approach an ideal logarithmic relation.

According to this embodiment of the invention, a light measuring circuit integrates the amount of light incident upon the light sensing element by charging a capacitor connected to the emitter of an expander transistor with current representing logarithmically compressed and expanded light striking the light sensing element. Charging means charge the capacitor to a predetermined voltage whose polarity is inverse of the emitter current, before the light integrating operation. This makes the relationship between the terminal voltage of the capacitor and the light striking the light sensing element more closely approximate a logarithmic relationship even in the range in which the amount of light striking the light sensing element is small. Hence, the incident light can be detected more accurately. Furthermore, even using a photodiode having a small current output as a light sensing element, namely one with a small PN junction area, a logarithmic relationship exists between the incident light and the voltage at the terminal of the capacitor. Thus, the light sensing element can not only be made small, but its cost may be low.

Column b of FIG. 4 illustrates the voltages achieved by various values of light by the circuit of FIG. 5 at low levels. It will be noted that an increase from 2 to 4 produces a voltage doubling of 18 mV.

Figure 7:
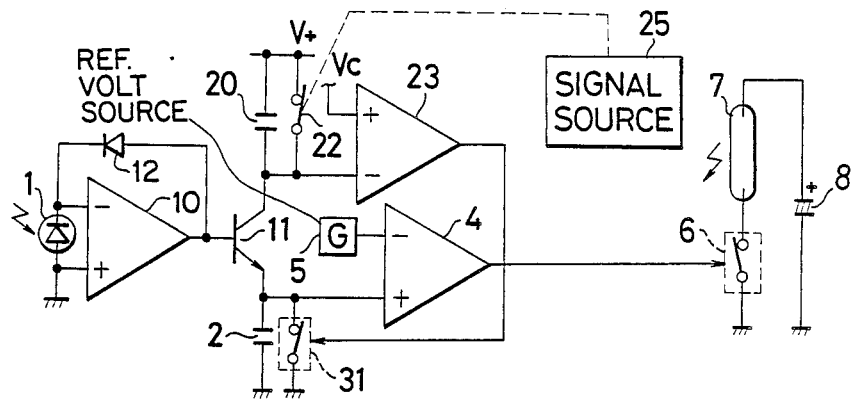
FIG. 7 is a schematic diagram of another device embodying features of the invention.

FIG. 7 illustrates another embodiment of the invention. Here, again, parts having reference numerals the same as those in FIGS. 1, 2, and 5, represent like elements. The signal source 25 open the switch 22 in synchronism with the start of a light measurement. Although the switch is shown as mechanical, it goes without saying that it can be replaced with a semiconductor switch.

A capacitor 20 is connected to the collector of the expander transistor 11. A comparator 23 detects the charge level of the capacitor 20 and goes high when the capacitor 20 charges to a predetermined level Vc. A switch 31 opens when the level of the output of the comparator 23 goes high. This switch can also be replaced with a semiconductor switch in the same manner as the switch 22.

Although the signal source 25 opens the switch 22 in synchronism with the start of a light measurement, it may also open the switch 22 with the start of light emission of the flash device when the present invention is applied to the light adjusting circuit of a flash unit. Furthermore, the source 25 may be synchronized with the start of a shutter curtain run.

Before the light integrating circuit starts its operation, both of the switches 22 and 31 are closed to discharge both of the capacitors 2 and 20. When the light integrating circuit starts to operate either in response to a signal for starting the operation of the flash unit or a signal which starts the shutter running, the switch 22 opens and the operational amplifier 10 and diode 12 compress the photocurrent produced by the light striking the photodiode, while the transistor 11 expands the latter signal.

The collector current through the transistor 11 charges the capacitor 20 until the charge exceeds a predetermined value. Then the level of the output of the comparator 23 goes high, and this opens the switch 31 and allows the emitter current of the transistor 11 to charge the capacitor 2. When the voltage of the capacitor 2 exceeds the reference voltage of the reference voltage source 5, the output of the comparator 4 goes from low to high and the light control circuit 6 stops the light emission of the flash discharge tube 7.

The relation between the terminal voltage of the capacitor 2 and the amount of light striking the photodiode is shown by the curve b in FIG. 3. Because the voltage of the capacitor 20 does not reach the predetermined value until a predetermined amount of light strikes the photodiode 1, the output of the comparator 23 remains low so that the switch 31 remains closed. This short circuits the capacitor 2 and its terminal voltage remains zero.

When the predetermined amount of light strikes the photodiode 1, the voltage of the capacitor 20 reaches the predetermined value and the output of the comparator 22 goes high. Hence, emitter current of the transistor 11 starts to charge the capacitor 2. Consequently, the terminal voltage of the capacitor 2 is zero, as shown by the curve b in FIG. 3, until the amount of light striking the photodiode 1 reaches the predetermined value and rises along the logarithmic curve according to the amount of light striking the photodiode.

This structure overcomes the shortcomings of conventional light integrating circuits where the relationship between the amount of light striking the light sensing element and the terminal voltage of the capacitor is not logarithmic in the range in which the amount of light striking the light sensing element is small. Also, it similarly has the advantages of the embodiment in FIG. 4.

Figure 8:
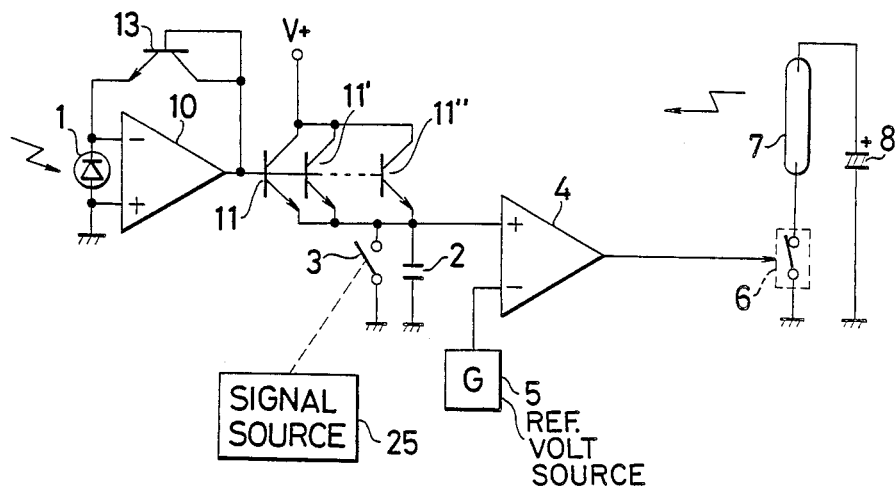
FIG. 8 is a schematic diagram of yet another device embodying the invention.

FIG. 8 illustrates yet another embodiment of the invention. Here, elements having the same reference numerals as in earlier figures represent like elements. In FIG. 8, transistors 11' and 11" have bases, emitters, and collectors common with those of the transistor 11. According to an embodiment of the invention, more than two such transistors may be added to the transistor 11. Instead of providing a plurality of transistors, whose bases, emitters, and collectors common with those of the transistor 11, a transistor whose junction area between its base and emitter is a plurality of times as large as a junction area between the base and the emitter of a diode-connected transistor 13 in the feedback loop of the operational amplifier 10 may be provided to achieve the same effect.

In operation, the photocurrent produced by the photodiode 1, which is current-to-voltage converted, and compressed by the transistor 13 which is diode-connected in the feedback path of the operational amplifier 10, is expanded by each of the transistors 11, 11' and 11" and charges the capacitor 2. Thus, the terminal voltage $V(t)$ of the capacitor 2 can be represented as follows:
$V(t) = \alpha \ln(nQ+1)$
where n is the number of transistors whose bases, emitters, and collectors are connected in common with those of the transistor 11.

If n is set to satisfy $nQ \gg 1$ in the above equation, namely, if a proper number of transistors whose bases, emitters, and collectors are common with those of the transistor 11 are provided, the terminal voltage $V(t)$ of the capacitor 2 can be approximated as follows: $V(t) = \alpha \ln(nQ)$, and the approximate logarithmic relationship shown by curve d in FIG. 6, and column c in the table of FIG. 4 prevails.

Figure 6:
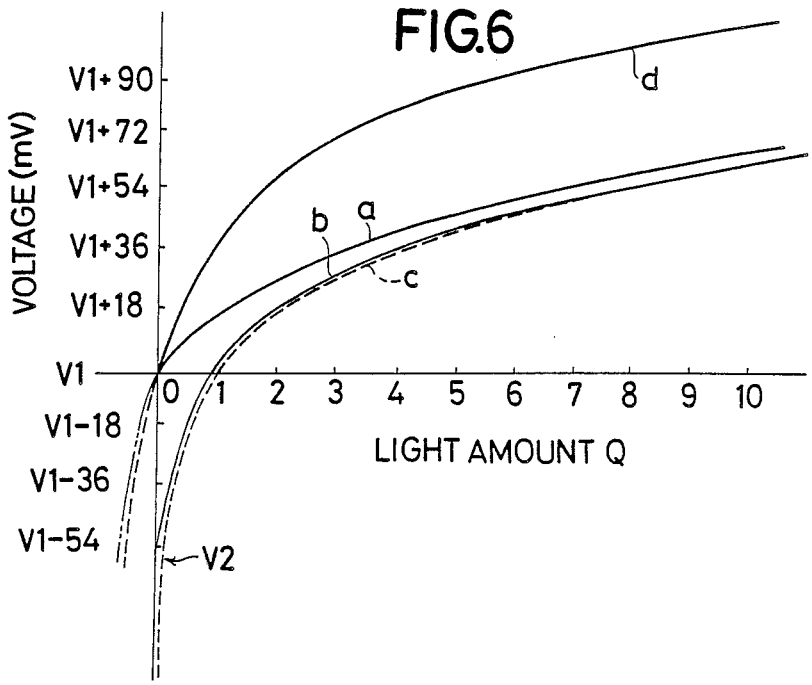
FIG. 6 is a graph also contrasting the operation of the invention with prior art devices.

The circuit of FIG. 8 will best be understood from considering FIG. 6, and the table of FIG. 4. In FIG. 4, column a represents the relation $Vc = \alpha \ln(Q+1)$ the amount Q of incident light and the terminal voltage Vc in a conventional circuit, and column b represents the ideal relation $Vc = \alpha \ln Q$ (in which the voltage Vc always increases a given value when the amount Q doubles whatever the amount Q may be) between the amount Q of incident light and the terminal voltage Vc.

As can be seen from column a, in a conventional circuit, when the light amount Q doubles from 1 to 2, the terminal voltage increases 28.6−18=10.6(mV). When the amount Q increases from 2 to 4, the voltage increases by 41.8−28.6=13.2(mV), and when the amount Q increases from 4 to 8, the voltage increases 57.1−41.8=15.3(mV). Therefore, the increasing amounts (increments) of the terminal voltage are 10.6, 13.2 and 15.3, which are far from the increase by a constant value.

In the present invention, as shown in column c, when the light amount Q increases from 1 to 2, the terminal voltage increases 57.1−41.8=15.3(mV). When the light amount Q increaes from 2 to 4, the voltage increases by 73.7−41.8=16.6 (mV) and when the light amount increases from 4 to 8, the voltage increases by 90.0−73.7=17.2 (mV). Thus, the increments of the voltage for doubling of the light amount Q are 15.3, 16.6 and 17.2 which approximate a constant value of increase and provide a relation very close to the ideal relation in curve c of FIG. 6.

In the circuit of FIG. 8, as shown by column c of FIG. 4, the voltage generated by the signal source 5 is set to correspond to the number of the transistors (11, 11', 11"). Also, because the terminal voltage generated in correspondence to the amount Q of incident light is higher than that in the conventional circuit, as shown by column a, it is possible to prevent the terminal voltage from being significantly influenced by noise.

Figure 9:
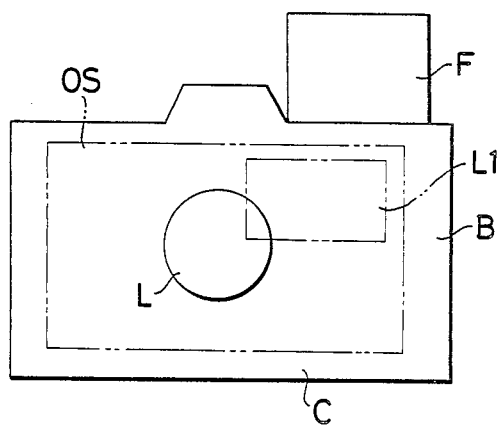
FIG. 9 is a block diagram of a camera flash system embodying features of the invention.

FIG. 9 shows the invention as embodied in a camera. Here a camera C includes a body B and an interchangeable lens L. In the body B, an otherwise conventional operating system OS for the camera C includes a light integrating circuit L1 which controls a flash unit F. The light integrating circuit L1 constitutes any one of the circuits in FIGS. 5, 7, or 8, and operates in the manner described with respect to those figures.

The invention is based on the recognition that if a logarithmic relation $Vb = \ln Q$ exists between the amount of incident light Q and the terminal voltage Vb of the capacitor, the terminal voltage increases by a specific constant value each time the amount Q doubles. In other words, when the terminal voltage Vb increases by the specific constant value, it can be assumed that the amount Q increases two times.

By contrast, in a conventional light measuring circuit, the relation $Vb = \ln(Q+1)$ prevails between the amount Q of incident light and the voltage Vb so that when the amount Q doubles, the terminal voltage Vb of the condenser does not always increase by a constant value. In other words, it is impossible to assume the amount of incident light has increased twice even if the terminal voltage has increased a constant amount.

Figure 10:
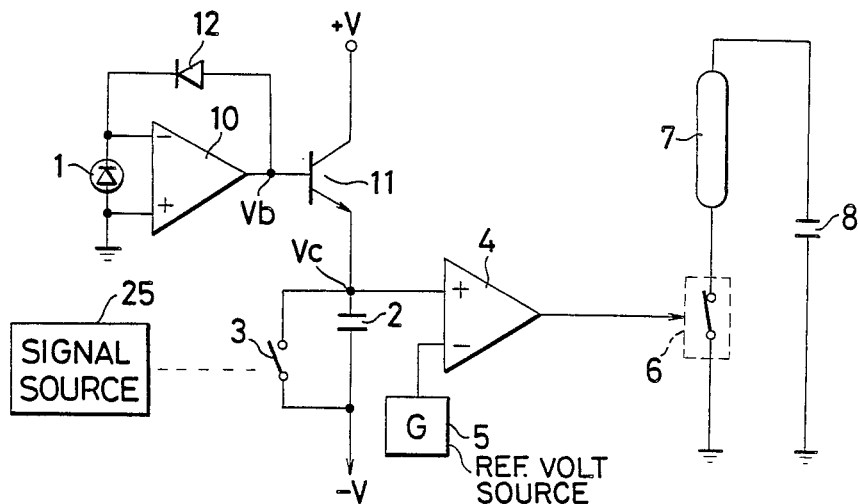
FIG. 10 is a schematic diagram of yet another embodiment of the invention.

The invention may also be embodied as shown in FIG. 10. Here, elements having the same reference numerals as in earlier Figures represent like elements. In FIG. 10, the capacitor 2 is connected to a voltage $-V10$, below ground, such as $-54$ millivolts. The switch 3 is connected across the capacitor 2.

In operation, the switch 3 short-circuits the capacitor 2. Hence, current through the transistor 11, arising from light striking the photosenser 1 and compressed by the diode 12 and amplifier 10, charges the capacitor 2 so that its lower terminal is at the negative voltage V10. When the source 25 opens the switch 3 at the start of a measurement, compressed current through the transistor 11 charges the capacitor 2 from a level $-V10$ below ground so that the voltage at the non-inverting terminal of the amplifier 4 does not exceed ground level until a predetermined delay. Accordingly, the voltage follows the essentially logarithmic curve b in FIG. 3 and b in FIG. 6, and produces the results in column b of FIG. 4. According to an embodiment of the invention, the structure of FIG. 10 is used in the camera of FIG. 9.

While embodiments of the invention have been described in detail, it will be evident to those skilled in the art that the invention may be embodied otherwise without departing from its spirit and its scope.

What is claimed is:
1. A light measuring device comprising:
(a) a light measuring circuit having a light receiving element and producing a logarithmically compressed signal of a current produced according to the light received by said light receiving element;
(b) expanding means for producing an expanded current obtained by expanding an output of said light measuring circuit;
(c) capacitor means for performing an integration operation of the expanded current produced by said expanding means, said capacitor means having a first output terminal connected to said expanding means and a second output terminal arranged to receive a first potential;
(d) start means for starting the integration operation of said capacitor means; and

(e) input means for inputting a second potential different from said first potential, to the first output terminal of said capacitor means prior to the start of the integration operation by said start means, an output from the second output terminal of said capacitor means gradually changing from the second potential toward the first potential with the start of the integration operation.

2. A light measuring device comprising:
(a) a light measuring circuit having a light receiving element and producing a logarithmically compressed signal of a current produced according to the light received by said light receiving element;
(b) expanding means for producing an expanded current obtained by expanding an output of said light measuring circuit;
(c) capacitor means for performing an integration operation of the expanded current produced by said expanding means;
(d) start means for starting the integration operation of said capacitor means; and
(e) timer means for counting time for a predetermined time in response to an instruction to start the integration operation, to acutate the start means after the predetermined time to start the integration operation.

3. A light measuring device according to claim 2, wherein said timer means actuates the start means after a counting time corresponding to said expanded current value.

4. A light measuring circuit according to claim 2, wherein said expanding means is a transistor having a base connected to said light measuring circuit, and an emitter connected to said capacitor means.

5. A light measuring device according to claim 3, wherein said expanding means is a transistor having a base connected to said light measuring circuit, and an emitter connected to said capacitor means.

6. A light measuring circuit comprising:
(a) a light sensing means for sensing light and producing a compressed signal representative of a logarithmic compression of the light sensed;
(b) conversion means for expanding said compressed signal and converting the same to a non-logarithmic signal;
(c) a capacitor for integrating the non-logarithmic signal from said conversion means, said capacitor having first and second terminals, wherein a predetermined voltage is applied onto said first terminal while said non-logarithmic signal is supplied to said second terminal of the capacitor;
(d) switching means for applying a lower voltage than said predetermined voltage to the second terminal before said non-logarithmic signal is supplied to said capacitor;
(e) control means for suspending the application of said lower voltage on the second terminal by said switching means and supplying said non-logarithmic signal to the second terminal; and
(f) detection means for detecting the output voltage of said capacitor thus detecting an integrated value of the output of the light sensing means after the non-logarithmic signal has been supplied to the capacitor by said control means.

7. A light measuring circuit comprising:
(a) light sensing means for sensing light and producing a compressed signal representative of a logarithmic compression of the light sensed;
(b) conversion means for expanding said compressed signal and converting said compressed signal to a non-logarithmic signal;
(c) a capacitor for integrating the non-logarithmic signal from said conversion means;
(d) timer means for generating an output after an elapse of a predetermined time;
(e) first switching means for actuating said timer means;
(f) second switching means for having said capacitor initiate the integration of the non-logarithmic signal in response to the output of said timer means; and
(g) detection means for detecting a terminal voltage of said capacitor thus detecting an integrated value of the output of the light sensing means after the timer means has been actuated by said first switching means.

* * * * *